United States Patent
Max et al.

(10) Patent No.: US 11,914,676 B2
(45) Date of Patent: Feb. 27, 2024

(54) MONITORING AND CORRECTING THE OBFUSCATION OF VEHICLE RELATED DATA

(71) Applicant: Volkswagen Aktiengesellschaft, Wolfsburg (DE)

(72) Inventors: Stephan Max, Gifhorn (DE); Christian Alexander Seidel, Bokensdorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 321 days.

(21) Appl. No.: 17/428,207

(22) PCT Filed: Jan. 30, 2020

(86) PCT No.: PCT/EP2020/052211
§ 371 (c)(1),
(2) Date: Aug. 3, 2021

(87) PCT Pub. No.: WO2020/160987
PCT Pub. Date: Aug. 13, 2020

(65) Prior Publication Data
US 2022/0120585 A1   Apr. 21, 2022

(30) Foreign Application Priority Data
Feb. 6, 2019   (DE) ...................... 10 2019 201 530.1

(51) Int. Cl.
*H04W 12/02*   (2009.01)
*G06F 18/23*   (2023.01)

(52) U.S. Cl.
CPC ............ *G06F 18/23* (2023.01); *H04W 12/02* (2013.01)

(58) Field of Classification Search
CPC ................................ H04W 12/02; G06F 18/23
(Continued)

(56) References Cited

U.S. PATENT DOCUMENTS

| 2003/0130893 | A1* | 7/2003 | Farmer | G06Q 30/0266 |
| | | | | 705/14.63 |
| 2014/0059694 | A1 | 2/2014 | Lortz et al. | |

(Continued)

FOREIGN PATENT DOCUMENTS

| CN | 107360551 A | 11/2017 |
| DE | 102016202659 B3 | 9/2016 |
| DE | 102016225287 A1 | 6/2018 |

OTHER PUBLICATIONS

Li et al., Real-time Location Privacy Protection Method Based on Space Transformation, 2018, International Conference on Computational Intelligence and Security (CIS) (Year: 2018).*

(Continued)

*Primary Examiner* — Thanh T Le
(74) *Attorney, Agent, or Firm* — Peter Zura; LOZA & LOZA, LLP

(57) ABSTRACT

Technologies and techniques for monitoring and correcting the obfuscation of vehicle-related data. Personal data may be removed from the transmitted vehicle-related data, and the vehicle-related data after the removal of the personal references may be combined to form a vehicle-related data set without personal references. A temporal and spatial obfuscation of the vehicle-related data set may be carried out without personal references based on an estimated size of a cluster of data-collecting vehicles for generating an anonymous data set. The anonymous data set, including the degree of obfuscation, may be provided to a data user and an actual cluster size for a spatial region based on the provided anonymous data sets may be determined and compared with the estimated cluster size used for the obfuscation of the anonymous data set. The comparison result may be then used to correct the obfuscation of the spatial region.

20 Claims, 1 Drawing Sheet

(58) Field of Classification Search
USPC .......................................................... 726/26
See application file for complete search history.

(56) References Cited

U.S. PATENT DOCUMENTS

| | | | |
|---|---|---|---|
| 2015/0178999 A1 | 6/2015 | Smith et al. | |
| 2016/0021070 A1 | 1/2016 | Wagner | |
| 2016/0293000 A1* | 10/2016 | Torgerson | G01S 19/42 |
| 2017/0103587 A1 | 4/2017 | Oberschachtsiek et al. | |
| 2017/0230797 A1 | 8/2017 | Lauterbach et al. | |
| 2017/0353855 A1 | 12/2017 | Joy | |
| 2018/0131740 A1 | 5/2018 | Ramamurthy et al. | |
| 2018/0173895 A1 | 6/2018 | Max et al. | |
| 2019/0309619 A1* | 10/2019 | Hoeink | H04L 63/0428 |
| 2021/0065168 A1* | 3/2021 | Liu | G06F 21/64 |
| 2021/0258776 A1* | 8/2021 | Stinner | G08G 1/096758 |

OTHER PUBLICATIONS

PCT/EP2020/052211. International Search Report (dated Apr. 9, 2020).

Gruteser et al. "Anonymous Usage of Location-Based Services Through Spatial and Temporal Cloaking." MobiSys '03: Proceedings of the 1st international conference on Mobile systems, applications and services. pp. 31-42 (May 2003).

Mokbel et al. "The New Casper: Query Processing for Location Services without Compromising Privacy." VLDB '06 Proceedings of the 32nd international conference on Very large data bases, Seoul, Korea (Sep. 12-15, 2006).

Asuquo et al. "Security and Privacy in Location-Based Services for Vehicular and Mobile Communications: An Overview, Challenges, and Countermeasures." IEEE Internet of Things Journal, vol. 5, No. 6, pp. 4778-4802 (Dec. 2018).

Gedek et al. "Protecting Location Privacy with Personalized k-Anonymity: Architecture and Algorithms." IEEE Transactions on Mobile Computing, vol. 7, No. 1, pp. 1-18 (Jan. 2008).

* cited by examiner

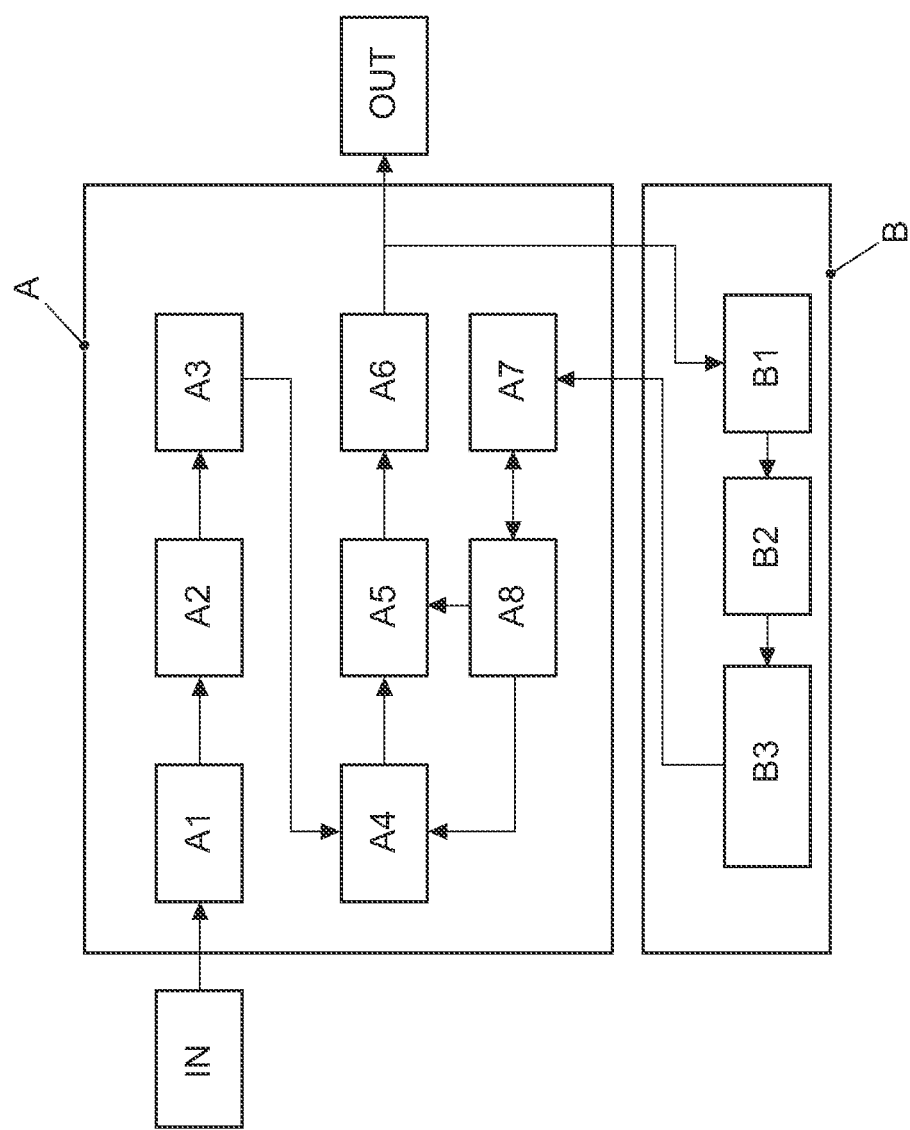

MONITORING AND CORRECTING THE OBFUSCATION OF VEHICLE RELATED DATA

CROSS REFERENCE TO RELATED APPLICATION

The present application claims priority to International Patent Application No. PCT/EP2020/05221 to Max, et al., filed Jan. 30, 2020, titled "Monitoring and Correcting the Obfuscation of Vehicle Related Data", which claims priority to German Patent Application No. 10 2019 201 530.1, to Max, et al., filed Feb. 6, 2019, the contents of each being incorporated by reference in their entirety herein.

FIELD OF TECHNOLOGY

The present disclosure relates to a method and a device for monitoring and correcting the obfuscation of data generated by a vehicle, such as environment data transmitted to a backend computer, hereinafter abbreviated as "backend," such that no conclusions regarding the vehicle and/or its occupants can be drawn from the obfuscated data.

BACKGROUND

In current applications, data generated by a sensor system in a vehicle is extracted by the vehicle for different systems, and sent to the backend. By way of example, data from vehicle sensors relating to time and location are used in applications such as weather forecasts, parking space occupancies, or traffic flow data. These data from the vehicle are then combined with data from other vehicles on a map in the backend, and the results are returned to the functions that use them.

For data protection reasons, all of the data sets are submitted to the respective function user in an anonymous form. The following sequence is used for this:
the vehicle sends the data in a personalized form to the backend,
the backend checks the data and anonymizes it, and
the functions using the data receive the anonymized data for further processing.

The anonymization itself is carried out on the basis of diverse assumptions, wherein a traffic flow and a market penetration are estimated in the field of the data gathering. So far, there is no means for checking these estimations in serial operation. Because data protection laws must be complied with, the estimation must be provided with additional security, which may result in a reduction in the quality of the data sets in some circumstances, thus reducing the informational value for the function using the anonymized data sets.

US 2018/0131740 A1 describes a system and a method for anonymizing transmitted data sets, comprising:
processing one or more data sets to obtain one or more anonymous vector displays of the data set,
uploading a generalized vector that contains a desired degree of anonymization,
comparing the anonymized vector displays of the data set with the generalized vector,
determining whether the anonymized vector displays of the data sets are sufficiently anonymized on the basis of the comparison,
identifying a time interval for sending the sufficiently anonymized data sets, and
increasing or reducing a quantity of computer resources that determine whether the vector displays of the data sets are sufficiently anonymized based on the remaining time in the time interval.

In other words, US 2018/0131740 A1 describes an algorithm that checks a data base to determine whether certain classes of data can be anonymized. The people living within the region or postal code are identified for this, for example. If the number of people within this postal code is large enough according to the anonymization requirements, these data are characterized as being able to anonymized, and made available for further processing. If they cannot be made available, further data are collected and checked until they can be made available.

Aspects of the present disclosure are therefore to create a method and a device for monitoring an anonymization filter for vehicle-related data.

SUMMARY

In some examples, a method is disclosed for monitoring and correcting the obfuscation of vehicle-related data transmitted to a backend computer by an anonymization filter comprising:
removing personal data from the transmitted vehicle-related data,
combining the vehicle-related data after the removal of personal references to obtain a vehicle-related data set without personal references,
temporally and spatially obfuscating the vehicle-related data set without personal references on the basis of an estimated size of a cluster of data-collecting vehicles to generate an anonymous data set, and
providing the anonymous data set, including the degree of obfuscation, to a data user, wherein
an actual cluster size for a spatial region is determined on the basis of the anonymous data sets that have been obtained,
the determined actual cluster size is compared with the cluster size that has been estimated for the obfuscation of the anonymous data set, and
the results of the comparison are used for correcting the obfuscation of the spatial region.

To obtain the parameters for the obfuscation, the functionality of the anonymization filter is therefore checked intermittently. The results of the comparison are then returned as a location-dependent correction value to the anonymization filter, thus correcting any possible deviations between the estimated cluster size and the measured reality, wherein the estimated cluster size can be estimated, for example, on the basis of traffic density in the environment of the data collecting vehicle.

The obfuscation is preferably corrected both temporally and spatially, such that the obfuscation is adapted to the reality in both regards. In other words, the obfuscation takes place by distorting the position and time of the measurement.

In some examples, the following may be carried out to determine an actual cluster size:
randomly selecting an initial anonymous data set,
collecting further anonymous data sets after the initial data set over a predetermined time interval, wherein the subsequent data sets relate to the region of the initial data set,
determining the actual cluster size by determining the number of anonymous data sets within the predetermined time interval for the spatial region predetermined by the obfuscated position of the initial data set,
comparing the actual cluster size with the estimated cluster size determined by the degree of obfuscation of the initial data set, and
correcting the obfuscation of the anonymization filter for the predetermined spatial region on the basis of the results of the comparison.

In this manner, the actual cluster size may be determined on the basis of the anonymous data sets collected after the initial data set for the spatial region defined by the position of the initial data set, such that the actual cluster size can then be used for correcting the estimated cluster size for this region. The time offset for the temporal obfuscation defined by the initial data set is preferably used as the predefined time interval for determining the actual cluster size.

The correction values for different spatial regions may also be stored in a correction map for the different spatial regions, and the estimated cluster size is corrected for the respective region on the basis of the correction map.

The correction of the obfuscation of the spatial region may also be differentialized continuously. This ensures that the correction takes place slowly on the basis of the determined actual cluster size, such that the correction map only changes slowly, in order to prevent fluctuations in the obfuscation behavior.

The degree of obfuscation of the anonymized data sets can also preferably be further checked to see if an attacker can still identify the data collecting vehicle from an anonymous data set. A mean time-to-confusion process can preferably be used for this.

In some examples, a device is disclosed for monitoring and correcting the obfuscation of the vehicle-related data transmitted to a backend computer, in which the device is configured to execute any of the methods explained above, wherein the device may include:
an anonymization filter for anonymizing the vehicle-related data, that has
a device for removing personal data,
a device for calculating traffic density,
a device for temporal obfuscation of the data,
a device for spatial obfuscation of the data, and
a device for outputting the anonymous data with information regarding the degree of obfuscation,
and
an observer, that has
a device for randomly selecting an anonymous data set,
a device for collecting further anonymous data sets for the same position, and determining the actual cluster sizes, and
a device for comparing the actual cluster sizes with the estimated cluster sizes to determine a correction parameter for the anonymization filter.

As explained above, the obfuscation takes place by distorting the measured position and the measured point in time. The comparable data sets for the observer that then determine the cluster size are determined within the temporal and spatial interval for the obfuscation.

The anonymization filter preferably includes a regulator and a correction map, by means of which the temporal and spatial obfuscation of the estimated cluster size is corrected for the current region.

The anonymization filter also preferably includes a device for creating and limiting a relevant data set. Data that would enable a conclusion to be drawn regarding the vehicle can be removed in this manner. By way of example, the regions surrounding the starting point and end point of the travel by the data-collecting vehicle are removed in order to ensure the anonymity of the vehicle.

BRIEF DESCRIPTION OF THE DRAWINGS

Embodiments of the present disclosure shall be explained in greater detail below in reference to the drawings. Therein:
FIG. 1 shows a schematic illustration of an anonymization filter with an observer connected thereto.

DETAILED DESCRIPTION

In some examples, vehicle-related personal data is configured to be sent to an anonymization filter A shown in FIG. 1, which is located in a data-collecting backend, via an input unit IN, wherein this vehicle related data comprise application-specific parameters. The personal data may include, for example, the vehicle identification number for the data-collecting and data-transferring vehicle, as well as other identifiers that would allow conclusions to be drawn regarding the vehicle or the people in the vehicle.

In other words, the anonymization filter A anonymizes the data received from a traveling vehicle, which collects data, such as the vehicle's environment while it is traveling by means of its environment sensor system, and sends this data to a backend through a wireless connection. This vehicle-related data may include, for example, information regarding weather conditions, current traffic conditions such as traffic flow, traffic obstructions such as congestion, construction sites, accidents, etc., and other information obtained from the sensors for the various assistance systems. The position of the vehicle is also determined, including a time stamp, the speed of the data-collecting vehicle, and identifiers for identifying the data-collecting vehicle. The anonymization filter A is thus used to remove personal data and to obfuscate data such that no conclusions can be drawn regarding the data-collecting vehicle, in order that the data can be provided to a third party for further evaluation.

In addition to the vehicle-related data, the aforementioned personal data, such as the vehicle identification number for the data-collecting and data-transmitting vehicle, as well as other identifiers that allow conclusions to be drawn regarding the vehicle or occupants of the vehicle, are removed from the data flow to the input unit IN in section A1 of the anonymization filter A.

In the subsequent section A2, the incoming data are combined to form a data set, wherein the data set is cropped by the setting of a starting and end mark. This means that the data surrounding a predefined region around the starting point and end point of travel by the vehicle are removed from the data flow, wherein the predefined region is defined by a predefined distance to the points where the data-collecting vehicle starts and ends its travel.

The traffic density is subsequently calculated in section A3. This is a matter of determining how many vehicles are located in the environment of the data-collecting vehicle. This can include, for example, an evaluation of the distances between the data-collecting vehicle and other vehicles in front of or behind it, taking the vehicle speed into account, from which the traffic density can be determined in the data-collecting vehicle's environment. The number of vehicles communicating with the backend in the current region where the data collection takes place is then estimated as a function of the position of the data-collecting vehicle based on the determined traffic density. If it is determined in section A3, e.g., based on the distance measurements, that there are 20 vehicles in a predefined environment, it can be determined that there are probably five of these 20 vehicles in the predefined environment of the type carrying out the data collection, based on the authorization statistics for the current region. It can then be assumed, on the basis of the distribution of the vehicle communication devices, that, on the average, three of these five vehicles are in communication with the backend.

A first anonymization takes place in section A4, in which the data from the data set generated in section A2 are obfuscated temporally, wherein the time stamps for the data are intentionally adulterated through obfuscation. This temporal obfuscation can be distributed linearly, for example, with a predefined time offset of 0 to 30 minutes, wherein the offset can also be a function of the estimated traffic density. Other temporal distribution functions for temporal obfuscation can also be used.

In the following section A5, the received data are spatially obfuscated in that the actual spatial position for the data is altered. This can take place, for example, by using a position distortion with a predefined distance, e.g., ±1 km. The intention of the spatial obfuscation along with the aforementioned temporal obfuscation is to make the data from the data-collecting vehicle appear as though it were generated by a cluster of a predefined number of vehicles. The size of the cluster that communicates with the backend in the region under consideration can be defined as ten vehicles.

The temporally and spatially obfuscated data of the data set from the data-collecting vehicle are combined with the indication of the degree of obfuscation according to the model settings in section A6 of the anonymization filter A, and the data set is made available to a user via the output OUT, who then evaluates the data sets according to his specifications and requirements. The degree of obfuscation indicates the size of the group, i.e. the cluster size, that has been reached for the obfuscation. By way of example, the data set is altered such that it can be generated from of cluster of ten possible vehicles, meaning that the size of the group defining the degree of obfuscation is ten in this example. The distribution function with which the data are obfuscated, including the time offset and which position distortions were used, is also output with the anonymized data set.

As specified above, the anonymization filter A comprising the sections A1 to A6 functions on the basis of a calculation of the traffic density in section A3, which contains an estimation of how many vehicles there are in the region in which the data are collected, and which communicates with the backend in question.

To validate and continuously improve the anonymization filter A and its estimation of the traffic density, an observer B is assigned to the anonymization filter A, wherein the observer B checks the functionality of the anonymization filter A at various points in time. In one example, this may be accomplished in the following manner:

The observer B extracts a random initial anonymous data set in section B1 with the specification of the degree of obfuscation. This extraction can either take place with each data set, or with each tenth, hundredth, or thousandth anonymized data set, depending on the necessary available computing resources.

In section B2, it is then checked which of the data sets after the extracted initial data set that are subjected to the anonymization filter A belong in an anonymization group with the initial data set. In other words, the other data sets within the position distortion of the initial data set are collected and combined with the initial data set in section B2, wherein this takes place within a predefined time interval ranging from zero to the predefined maximum time offset for the temporal obfuscation specified above.

After this time interval, the data that have been collected in section B3 are counted and the anonymization group obtained for the distorted position of the initial data set is thus determined. This measured actual value, such as the number of data sets found in the time interval within the position interval, is compared with the target value, i.e. the size of the group indicated in the initial data set. The difference between the target size estimated in section A3 of the anonymization filter A and the actual size is then sent with a location and time reference for the data to a regulator A7 in the anonymization filter A.

The regulator A7 enters the result in a correction map in section A8, specifically the difference between the target and actual values, wherein section A8 is then only adjusted to a certain extent using the regulator A7 and the correction map. The correction map itself is composed of map tile elements, which have a respective correction value, depending on the observer B, which directly adjusts the obfuscation in the respective tile. As a result, the model for obfuscating the transmitting vehicle is adapted as closely as possible to reality. A tile element in a map comprises a predefined field of numerous positions. In other words, a map of a country comprises a predefined number of tile elements that cover the map of the country.

The aim in adjusting the correction map is to alter the correction map slowly. Positive and negative spikes can therefore be identified by the regulator A7 and absorbed, such that the correction map is correct on average. Due to local clusters of vehicles or types of vehicles as specific points in time, there may be brief spikes in the vehicle cluster, which are not allowed to affect the correction map in section A8. In addition to the location, i.e., the position, the model is also corrected in another dimension with regard to the time for the data. Temporal deviations from the model are detected, and can then be corrected accordingly with respect to the location. In other words, the correction map cannot be adjusted erratically, because this could result in oscillations in the regulator. If the measurement by the observer B then indicates that there is an actual cluster size of ten vehicles, even though a cluster size of 20 vehicles is assumed for the obfuscation on the basis of the estimation of the traffic density, the temporal and spatial obfuscation is not altered abruptly in that the cluster size used for the obfuscation is increased to 20 vehicles, instead a mean value of 15 vehicles can be used in the correction map, which can then be slowly increased by the observer B.

While the aim of the concept of the observer B is to randomly check the obfuscation process and its parameters, an additional mechanism can also be implemented on the backend, that continuously measures and quantifies the degree of obfuscation, i.e., the effectiveness of the selected method. This also relates to checking whether an attacker is capable of identifying a person or vehicle from a data set, or establish a relationship to an individual in the anonymized data set from the existing data set using extraction methods, so-called singling out, by establishing a link thereto, e.g., through a correlation analysis, or inference, i.e., deriving the value of a feature from the values of a series of other features with a significant probability.

Because this relates to geospatial data and data with relevant time stamps, the "mean time-to-confusion (MTTC)" method can be used for this. This method continuously measures how long an attacker is able to track an anonymous user in a defined confidentiality environment. The better the method is for anonymization of the data set, the shorter the MTTC. The algorithm therefore forms a measure for the efficacy of the selected anonymization method.

Travel in a data set of randomized travels by various vehicles can thus be assigned to the original travel with a specific probability based on the time, location, direction of travel, and speed. When this is repeated with a large data set, it is possible to calculate how long a trajectory can be tracked in an anonymized data set with a defined probability. The MTTC can then be obtained from this distribution of the "time to confusion" as a function of the lengths of the trajectories.

The efficacy of the anonymization components can be continuously checked in the back end with the proposed concept of the observer, both through random sampling by the observer B and using the MTTC method, for example. This significantly increases the conformity of the use of anonymized personal data to data protection laws.

LIST OF REFERENCE SYMBOLS

A anonymization filter
B observer
IN input original data set
OUT output anonymized data
A1 removal of personal data from the original data set
A2 cropping of the data set
A3 calculation of traffic density
A4 temporal obfuscation
A5 spatial obfuscation
A6 data set without personal reference, including specification of the degree of obfuscation
A7 regulator for correcting the obfuscation
A8 correction map with respect to the intensity of the obfuscation
B1 random selection of a data set
B2 collection of further data sets with the same position
B3 determination of a correction parameter based on the collected data sets

The invention claimed is:

1. A method for monitoring and correcting obfuscation of vehicle-related data transmitted to a backend computer with an anonymization filter, comprising:
    removing personal data from the transmitted vehicle-related data;
    combining the vehicle-related data, after removing the personal data, to obtain a vehicle-related data set without personal information;
    temporally and spatially obfuscating the vehicle-related data set without personal data based on an estimated cluster size of data-collecting vehicles to generate an anonymous data set;
    sending the anonymous data set, including a degree of obfuscation, to a data user;
    determining an actual cluster size for a spatial region based on the anonymous data set;
    comparing the determined actual cluster size with the estimated cluster size for the obfuscation of the anonymous data set; and
    correcting the obfuscation of the spatial region, based on the results of the comparison of the actual cluster size with the estimated cluster size.

2. The method according to claim 1, wherein the correcting of the obfuscation of the spatial region comprises correcting the obfuscation both temporally and spatially.

3. The method according to claim 1, wherein determining the actual cluster size, comprises:
    randomly selecting an initial anonymous data set;
    collecting other anonymous data sets after the initial anonymous data set is selected for a predetermined time interval, wherein the subsequent data sets relate to the region of the initial anonymous data set;
    determining the actual cluster size by determining a number of anonymous data sets within the predetermined time interval for the spatial region predefined by an obfuscated position of the initial anonymous data set;
    comparing the actual cluster size with an estimated cluster size determined by a degree of obfuscation for the initial anonymous data set; and
    correcting obfuscation of the anonymization filter for the predefined spatial region based on the comparing of the actual cluster size with the estimated cluster size.

4. The method according to claim 1, further comprising storing correction values for different spatial regions in a correction map for the different spatial regions, and correcting an estimated cluster size for a respective region based on the correction map.

5. The method according to claim 1, wherein correcting the obfuscation of the spatial region comprises continuously correcting the obfuscation differentially.

6. The method according to claim 1, further comprising checking the degree of obfuscation of the anonymous data set to determine whether an attacker can identify a data-collecting vehicle from an anonymous data set.

7. The method according to claim 6, wherein checking the degree of obfuscation of the anonymous data set comprises utilizing a mean-time-to-confusion method.

8. A system for monitoring and correcting obfuscation of vehicle-related data, comprising:
    an input circuit for receiving the vehicle-related data via a wireless connection;
    a backend computer, operatively coupled to the input circuit, the backend computer comprising an anonymization filter for anonymizing vehicle-related data, wherein the anonymization filter comprises
        a filter section for removing personal data;
        a filter section for calculating traffic density;
        a filter section for temporal obfuscation of the data;
        a filter section for spatial obfuscation of the data; and
        a filter section for outputting anonymous data comprising a specification of a degree of obfuscation;
    and wherein the backend computer comprises an observer circuit, operatively coupled to the anonymization filter, the observer circuit comprising
        an observer section for randomly selecting an anonymous data set;
        an observer section for collecting further anonymous data sets for a same position, and determining an actual cluster size; and
        an observer section for comparing the actual cluster size with an estimated cluster size to determine a correction parameter for the anonymization filter,
    and wherein the observer circuit is configured to check functionality of the anonymization filter.

9. The system according to claim 8, wherein the anonymization filter further comprises a regulator and a correction map.

10. The system according to claim 8, wherein the anonymization filter comprises a filter section for producing and limiting a data set.

11. The system according to claim 8, wherein the observer circuit is further configured to correct obfuscation both temporally and spatially.

12. The system according to claim 8, wherein the observer circuit is configured to determine the actual cluster size by:
   randomly selecting an initial anonymous data set;
   collecting other anonymous data sets for a predetermined time interval after the initial anonymous data set is selected, wherein the subsequent data sets relate to the region of the initial anonymous data set;
   wherein the actual cluster size is determined by a number of anonymous data sets within the predetermined time interval for the spatial region, predefined by an obfuscated position of the initial anonymous data set;
   comparing the actual cluster size with the estimated cluster size determined by a degree of obfuscation for the initial anonymous data set; and
   correcting obfuscation of the anonymization filter for the predefined spatial region based on the comparing of the actual cluster size with the estimated cluster size.

13. The system according to claim 8, wherein the observer circuit is further configured to store correction parameters for different spatial regions in a correction map for the different spatial regions, and correct the estimated cluster size for a respective region, based on the correction map.

14. The system according to claim 8, wherein the observer circuit is configured to correct the obfuscation of the spatial region by continuously correcting the obfuscation differentially.

15. The system according to claim 8, wherein the observer circuit is further configured to check a degree of obfuscation of the anonymized data set to determine whether an attacker can identify a data-collecting vehicle from an anonymous data set.

16. The system according to claim 15, wherein the observer circuit is configured to check the degree of obfuscation utilizing a mean-time-to-confusion method.

17. A method for monitoring and correcting obfuscation of vehicle-related data transmitted to a backend computer with an anonymization filter, comprising:
   removing personal data from the transmitted vehicle-related data;
   processing the vehicle-related data to remove the personal data to obtain a vehicle-related data set;
   temporally and spatially obfuscating the vehicle-related data set based on an estimated cluster size of data-collecting vehicles to generate an anonymous data set; and
   sending the anonymous data set, including a degree of obfuscation, to a data user;
   determining an actual cluster size for a spatial region based on the anonymous data set;
   comparing the determined actual cluster size with an estimated cluster size for the obfuscation of the anonymous data set; and
   correcting obfuscation of the anonymization filter for the spatial region based on the comparison results.

18. The method according to claim 17, wherein determining the actual cluster size, comprises:
   randomly selecting an initial anonymous data set;
   collecting other anonymous data sets after an initial anonymous data set is selected for a predetermined time interval, wherein the subsequent data sets relate to the region of the initial anonymous data set;
   determining the actual cluster size by determining a number of anonymous data sets within the predetermined time interval for the spatial region predefined by an obfuscated position of the initial anonymous data set;
   comparing the actual cluster size with the estimated cluster size determined by a degree of obfuscation for the initial data set; and
   correcting obfuscation of the anonymization filter for the predefined spatial region based on the comparing of the actual cluster size with the estimated cluster size.

19. The method according to claim 17, further comprising storing correction values for different spatial regions in a correction map for the different spatial regions, and correcting the estimated cluster size for a respective region, based on the correction map.

20. The method according to claim 17, wherein correcting the obfuscation of the spatial region comprises continuously correcting the obfuscation differentially.

* * * * *